R. G. EDGERTON.
INTERNAL COMBUSTION ENGINE TESTING DEVICE.
APPLICATION FILED MAR. 31, 1917.

1,257,468.

Patented Feb. 26, 1918.

Inventor
R. G. Edgerton,
By Norman T. Whitaker
Attorney

UNITED STATES PATENT OFFICE.

ROY GARLAND EDGERTON, OF SUFFOLK, VIRGINIA.

INTERNAL-COMBUSTION-ENGINE-TESTING DEVICE.

1,257,468.     Specification of Letters Patent.     Patented Feb. 26, 1918.

Application filed March 31, 1917. Serial No. 158,988.

*To all whom it may concern:*

Be it known that I, ROY G. EDGERTON, a citizen of the United States, and a resident of Suffolk, in the county of Nansemond and State of Virginia, have invented new and and useful Improvements in Internal-Combustion-Engine-Testing Devices, of which the following is a specification.

This invention relates to improvements in internal combustion engine testing devices.

The primary object of this invention is to provide a testing device for the cylinders of internal combustion engines which will enable an operator to ascertain which of the cylinders are working satisfactorily.

A further object of this invention is to provide a device of the above mentioned character which is adapted to test one or more of the cylinders of an internal combustion engine at the same time.

A still further object is to provide a testing device for internal combustion engines which may be readily applied to or removed from the cylinders of the internal combustion engine and which is strong and durable and easy and inexpensive to manufacture.

Other objects and advantages of this invention will be apparent from the following description taken in conjunction with the accompanying drawings and the particular features of novelty will be pointed out in the appended claims.

Figure 1:
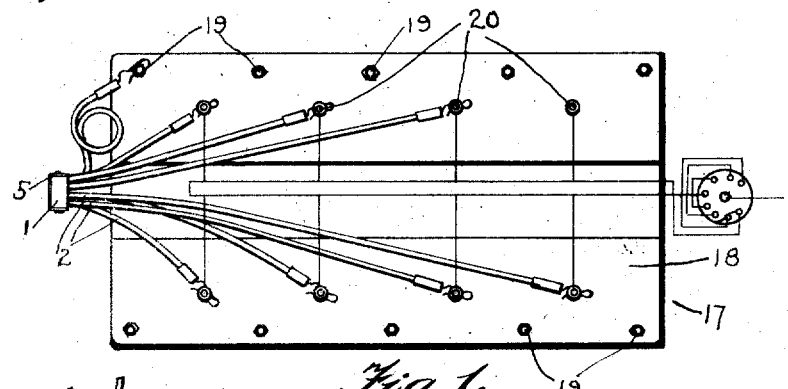
Figure 2:
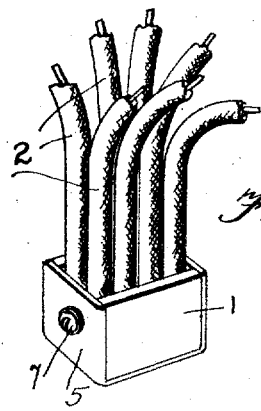
Figure 3:
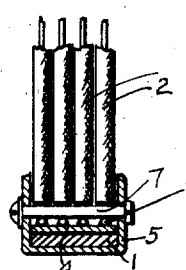
Figure 4:
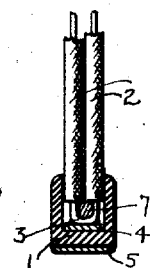
Figure 7:
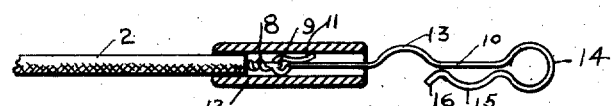
Figure 5:
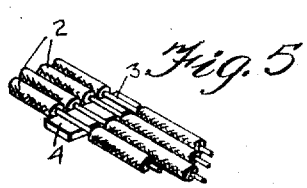
Figure 8:
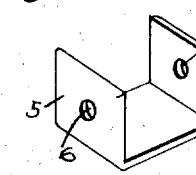
Figure 6:
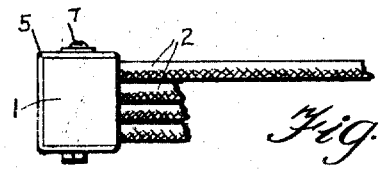
Figure 9:
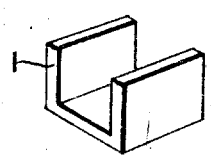

In the drawings in which similar characters of reference refer to similar parts in the several views, Figure 1 denotes a top view of the internal combustion engine showing my testing device applied for testing the cylinders of same, Fig. 2 is an enlarged view of the member to which the conductors are connected, Fig. 3 is a cross sectional view of the member to which the conductors are connected, showing the conductors in position therein, Fig. 4 is a cross sectional view of the end of the member to which the conductors are connected, Fig. 5 is a view of a portion of the conductors, Fig. 6 is a side view of a portion of the device, Fig. 7 is a cross sectional view of one of the ends of the conductors showing a clip associated therewith, Fig. 8 is a view of a portion of the member to which the conductors are connected, and Fig. 9 is a view of another portion of the member to which the conductors are connected.

Referring more particularly to the drawings, the numeral 1 denotes a substantially U-shaped member which is preferably formed of fibrous or other non-conducting material. The numeral 2 denotes electric conductors. As shown clearly in Fig. 5, the insulation on the conductors 2 is stripped for a short distance as at 3 and these stripped portions of the conductors are then soldered or otherwise suitably affixed to a plate 4, which may be of brass, copper or like metal. The plate 4 is of such a size that it will fit within the U-shaped member 1, the conductors then being in the position shown clearly in Fig. 2.

A second substantially U-shaped member 5 is provided which is preferably formed of metal and is slightly larger in proportion than the U-shaped member 1. The parallel sides of member 5 are each provided with an opening 6. This U-shaped member 5 is positioned upon member 1 in the position shown clearly in Fig. 2 with the parallel sides of member 5 adjacent the open ends of member 1. A bolt 7 is then inserted in the opening 6 in member 5 and will lie between the conductors 2 and serve to hold the several parts of the device in position.

The numeral 2 in Fig. 7 denotes the end of the conductor shown in Figs. 1 and 2 with the insulation at the end thereof stripped for a short distance as shown at 8. The stripped portion 8 is formed into a loop 9. The numeral 10 denotes a spring wire clip which is preferably made of one piece of wire and has one end formed into a spring member 11 which is adapted to be inserted within the loop 9 and engage against the inner portion of the open ended cylindrical sleeve 12. This sleeve 12 is preferably formed of fibrous or other like non-conducting material and is of such size as to allow the conductor 2 to tightly fit therein. The clip 10 is provided with a substantially arcuate shape portion 13, the purpose of which will be hereinafter described.

The other end of clip 10 is bent over upon itself in such a manner as to form an eye 14 and arcuate shape portion 15. The end adjacent the portion 15 is then bent outwardly as shown at 16.

This invention, as above stated, is adapted to test the cylinders of an internal combustion engine. The numeral 17 denotes an engine of the above mentioned character which is provided with a head 18 which is secured by means of bolts 19. Mounted on the head are the customary spark plugs 20. In use one of the conductors 2 is engaged by means of the clip 10 and eye 14 with one of the bolts 19 or with any other suitable metal part of the engine. The remaining conductors are then engaged by other respective spring clips with the spark plugs of the cylinders which are to be rendered inoperative. It can be readily seen that because of the peculiar construction of the clip 10 that it may be easily engaged with the spark plug, the arcuate shaped portion 13 and the bent out portion 16 permitting the easy application of the clip 10 with the spark plug which will, it is obvious, be engaged in the clip at 15.

When the conductors are connected, as above stated, the current to the spark plugs which are engaged with the clips will be short circuited to the bolt 19 or other metal part to which one of the conductors are connected. This will of course render the cylinders which are in this circuit inoperative. The cylinders not in this circuit will operate as before and their condition can hence be ascertained. It is also obvious that this invention can be used for the purpose of burning carbon from the cylinders while allowing one or more of the cylinders to operate in the manner shown, for a short length of time.

In reduction to practice, I have found that the form of my invention illustrated in the drawings and referred to in the above description, as the preferred embodiment is the most efficient and practical, yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention as defined in the appended claims.

Having thus described my invention, what I claim as new and desire to secure by Letters Patent is:

1. A testing device for internal combustion engines comprising a plurality of conductors, provided with a stripped portion, the said conductors being secured at their stripped portion to a plate, a substantially U-shaped fibrous member adapted to receive the conductors, a second U-shaped metal member engaging the first named U-shaped member at the open ends thereof, means associated with the second named U-shaped member for securing the conductors in the first named U-shaped member, fibrous sleeves each adapted to engage one end of a conductor, a clip secured to one end of each conductor and springily held within one of said sleeves.

2. A testing device for internal combustion engines comprising a plurality of conductors provided with a stripped portion, the said conductors being secured at their stripped portion to a plate, a substantially U-shaped fibrous member adapted to receive the plate, a second substantially U-shaped metal member adapted to engage the first named U-shaped member at the open ends thereof, a bolt secured to the second named U-shaped member and adapted to pass between the conductors, a spring wire clip removably secured to the end of each conductor, and a fibrous sleeve removably secured to the end of each conductor and adapted to engage one end of a spring wire clip.

ROY GARLAND EDGERTON.